(12) United States Patent
Sassen et al.

(10) Patent No.: US 8,587,261 B2
(45) Date of Patent: Nov. 19, 2013

(54) LIGHTWEIGHT POWER SYSTEM FOR CONTINUOUSLY CHARGING MULTIPLE BATTERY POWERED DEVICES CARRIED BY A DISMOUNTED SOLDIER

(75) Inventors: Jonathan Mark Sassen, Ramat Beit Shemesh (IL); Grover Leland Nall, Jr., Southside, AL (US); Ronen Badichi, Elazar (IL); Jeffrey Nelson Jubin, Jamesburg, NJ (US); Anatoly Rivin, Beer Sheva (IL)

(73) Assignee: Electric Fuel Battery Corporation, Auburn, AL (US)

( * ) Notice: Subject to any disclaimer, the term of this patent is extended or adjusted under 35 U.S.C. 154(b) by 250 days.

(21) Appl. No.: 13/151,850

(22) Filed: Jun. 2, 2011

(65) Prior Publication Data

US 2012/0306434 A1 Dec. 6, 2012

(51) Int. Cl.
*H02J 7/04* (2006.01)
*H02J 7/00* (2006.01)

(52) U.S. Cl.
USPC ............................ 320/162; 320/115; 320/138

(58) Field of Classification Search
USPC .................. 320/110, 115, 107, 138, 162, 163
See application file for complete search history.

(56) References Cited

U.S. PATENT DOCUMENTS

| | | | | |
|---|---|---|---|---|
| 5,680,026 | A * | 10/1997 | Lueschen | 429/97 |
| 5,869,949 | A * | 2/1999 | Nishikawa et al. | 320/101 |
| 5,914,585 | A * | 6/1999 | Grabon | 320/125 |
| 6,137,260 | A * | 10/2000 | Wung et al. | 320/116 |
| 6,894,457 | B2 * | 5/2005 | Germagian et al. | 320/119 |
| 7,633,265 | B2 * | 12/2009 | Matsushima et al. | 320/134 |
| 7,659,696 | B2 * | 2/2010 | Zeiler et al. | 320/115 |
| 7,855,528 | B2 * | 12/2010 | Lee | 320/107 |
| 7,893,657 | B2 * | 2/2011 | Chavakula | 320/138 |
| 2009/0179615 | A1 * | 7/2009 | Amron | 320/114 |

* cited by examiner

*Primary Examiner* — Richard V Muralidar
(74) *Attorney, Agent, or Firm* — Lowenstein Sandler LLP

(57) ABSTRACT

An apparatus for charging multiple rechargeable devices is disclosed. The apparatus includes a hub or multiple T-connectors connected between a power source, preferably a Zinc-air battery, and several chargers, the hub/T-connectors configured to provide electrical and mechanical connectivity between the power source and the chargers. The apparatus includes housings configured to encase the chargers and to conformally receive each of the corresponding devices containing rechargeable batteries. The apparatus further includes pouches configured to removably receive chargers, devices, and the power source. When the power source voltage falls below a certain threshold, then a charger associated with a device having the smallest difference between its rated voltage and its measured voltage discontinues charging before other chargers. The apparatus is wearable by a user.

21 Claims, 9 Drawing Sheets

LIGHTWEIGHT POWER SYSTEM FOR CONTINUOUSLY CHARGING MULTIPLE BATTERY POWERED DEVICES CARRIED BY A DISMOUNTED SOLDIER

GOVERNMENT RIGHTS IN THIS INVENTION

This invention was made with U.S. government support under Army contract number BAA W15P7T-07-R-P042. The U.S. government has certain rights in this invention.

FIELD OF THE INVENTION

The present invention relates generally to power systems, and more particularly, to a system and a method for continuously charging a plurality of original equipment manufacturer (OEM) batteries carried in equipment worn by a soldier on the battlefield.

BACKGROUND OF THE INVENTION

There has been a proliferation of electronic equipment employed in the battlefield. More particularly, a soldier carries a plurality of electronic devices that require battery power. These electronic devices may include one or more radios, a GPS receiver, a laser target designator, and a battlefield computer. Mission profiles have increased the number of handheld devices and the time that the devices need to operate. In certain conditions, a soldier may need to carry up to 72 batteries of varying voltage and current requirements and size, the total number of batteries having a weight in excess of 20 pounds. Moreover, many batteries, such as lithium-ion batteries, have the potential to catch fire or even explode when in use.

Hence, there is a need in the art to reduce battery weight and the types of batteries carried by a soldier.

Conventional portable power solutions have reduced total battery count and weight by replacing the batteries with so-called battery eliminators. When battery eliminators are employed, the various batteries associated with the plurality of electronic devices are removed and the resulting empty battery compartments are retrofitted with adapters that directly supply power. Power is continuously supplied from a wearable battery via cables configured to be integrally attached to each of the adapters incorporated into the body armor of the soldier. As a result, when/if the soldier removes any electronic equipment from his body armor, power is lost to the removed electronic equipment. Further, battery eliminators continue to supply power at about 100% capacity, which produces inefficiencies.

Accordingly, what would be desirable, but has not yet been provided, is a system and a method for continuously charging a plurality of original equipment manufacturer (OEM) batteries carried in equipment worn by a soldier on the battlefield that is ergonomic to use, that reduces the cost and complexity of controlling centralized power to the multiple devices carried by the soldier, that supplies power to multiple devices using a charging method that provides a maximum device charge with a minimum consumption of energy in a minimal amount of time, where power is not lost when/if the electronic equipment from the body armor is removed.

SUMMARY OF THE INVENTION

The above-described problems are addressed and a technical solution is achieved in the art by providing an apparatus and method for charging a plurality of devices, comprising: a power source; a plurality of chargers in signal communication with the power source, a plurality of housings configured to encase each of the plurality of chargers and to conformally receive a corresponding one of the plurality of devices; and a plurality of pouches configured to receive the plurality of chargers, devices, and housings, wherein a corresponding one of the plurality of devices is removably insertable into a corresponding pouch and charger, and wherein the apparatus is configured to be worn by a user.

According to an embodiment of the present invention, a charger associated with a device having the smallest difference between its rated voltage and its measured voltage discontinues charging before other chargers of the plurality of chargers.

According to an embodiment of the present invention, each of the plurality of chargers is configured to: (a) charge a corresponding device; and (b) when a voltage of the power source falls below a low threshold: (c) count a predetermined voltage step with a predetermined time delay between a rated voltage of the corresponding device and a measured voltage of the corresponding device; (d) discontinue charging the corresponding device when the voltage of the power source remains below the low threshold; (e) repeat (a)-(d) when the voltage of the power source remains between the low threshold and a recovered threshold greater than the low threshold; and (f) repeat (a)-(e) when the voltage of the power source is equal to or exceeds the recovered threshold.

According to an embodiment of the present invention, each of the plurality of chargers is further configured to discontinue charging its corresponding device when the measured voltage of the corresponding device exceeds a predetermined charged threshold. The predetermined charged threshold may be a predetermined voltage below the rated voltage of the corresponding device or a predetermined percentage of the rated voltage.

According to an embodiment of the present invention, each of the plurality of chargers may be further configured to: (g) re-measure a voltage of its corresponding device; (h) re-start charging the corresponding device when the re-measured voltage of the corresponding device falls below the predetermined charged threshold; and (i) repeat (g) and (h) when the re-measured voltage of the corresponding device is equal to or exceeds the predetermined charged threshold. Each of the plurality of chargers may be further configured to repeat (a)-(f) when the re-measured voltage of its corresponding device falls below the predetermined charged threshold.

According to an embodiment of the present invention, the plurality of chargers may be connected in parallel with the power source. The power source is a battery, preferably, but not limited to, a zinc-air battery (the power source may be any 12 volt battery in the Defense Logistics Agency (DLA) Inventory—DLA is a logistics combat support agency whose primary role is to provide supplies and services to America's military forces worldwide).

According to an embodiment of the present invention, the apparatus may further comprise a hub connected between the battery and the plurality of chargers, wherein the hub is configured to provide electrical and mechanical connectivity between the battery and the plurality of chargers. The apparatus may further comprise a plurality of T-connectors connected between the battery and each of the plurality of chargers, wherein the plurality of T-connectors is configured to provide electrical and mechanical connectivity between the battery and the plurality of chargers.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
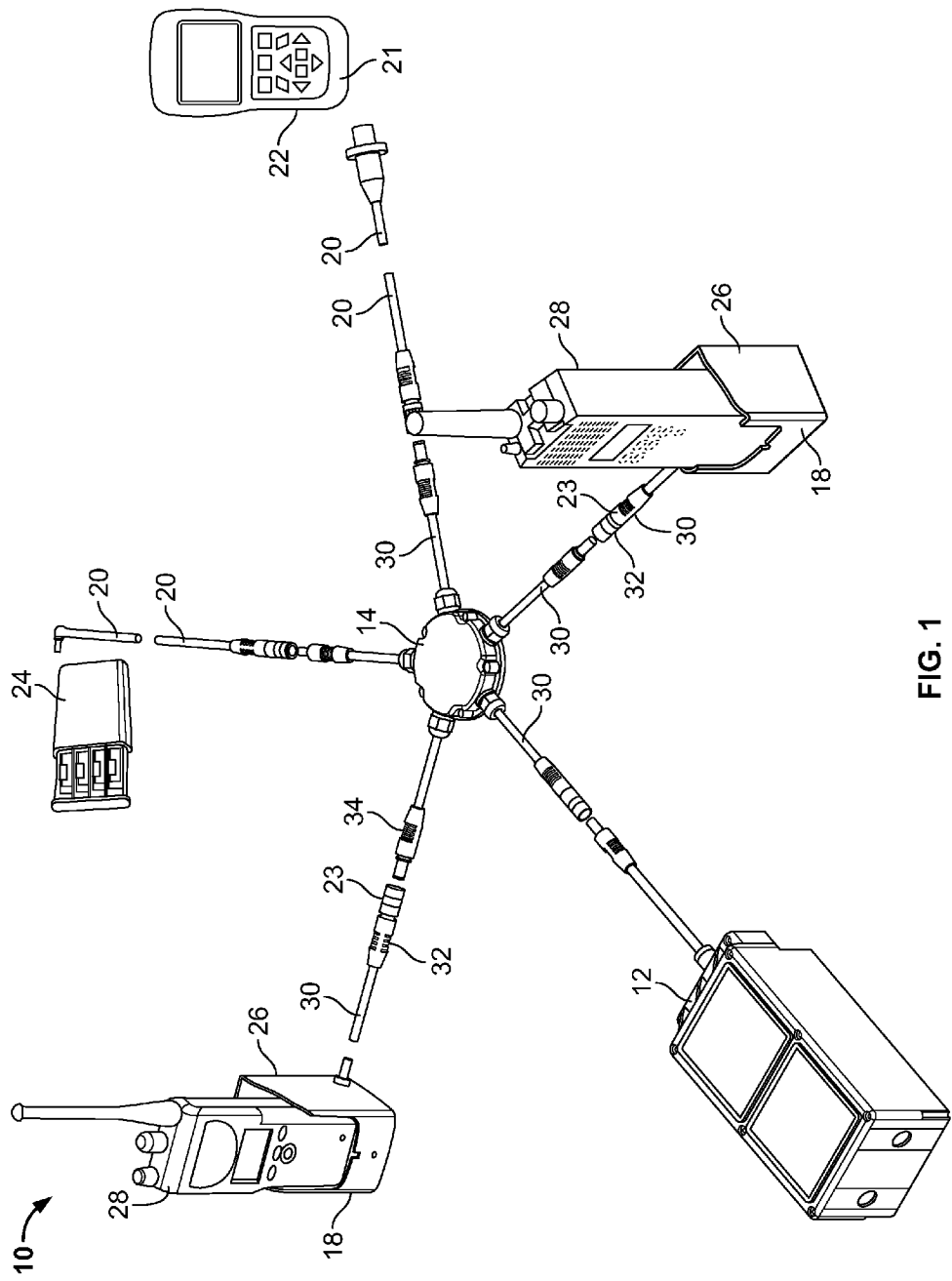
FIG. 1 is an exploded view of the components of a portable multiple battery rapid charging system, according to an embodiment of the present invention.
Figure 2:
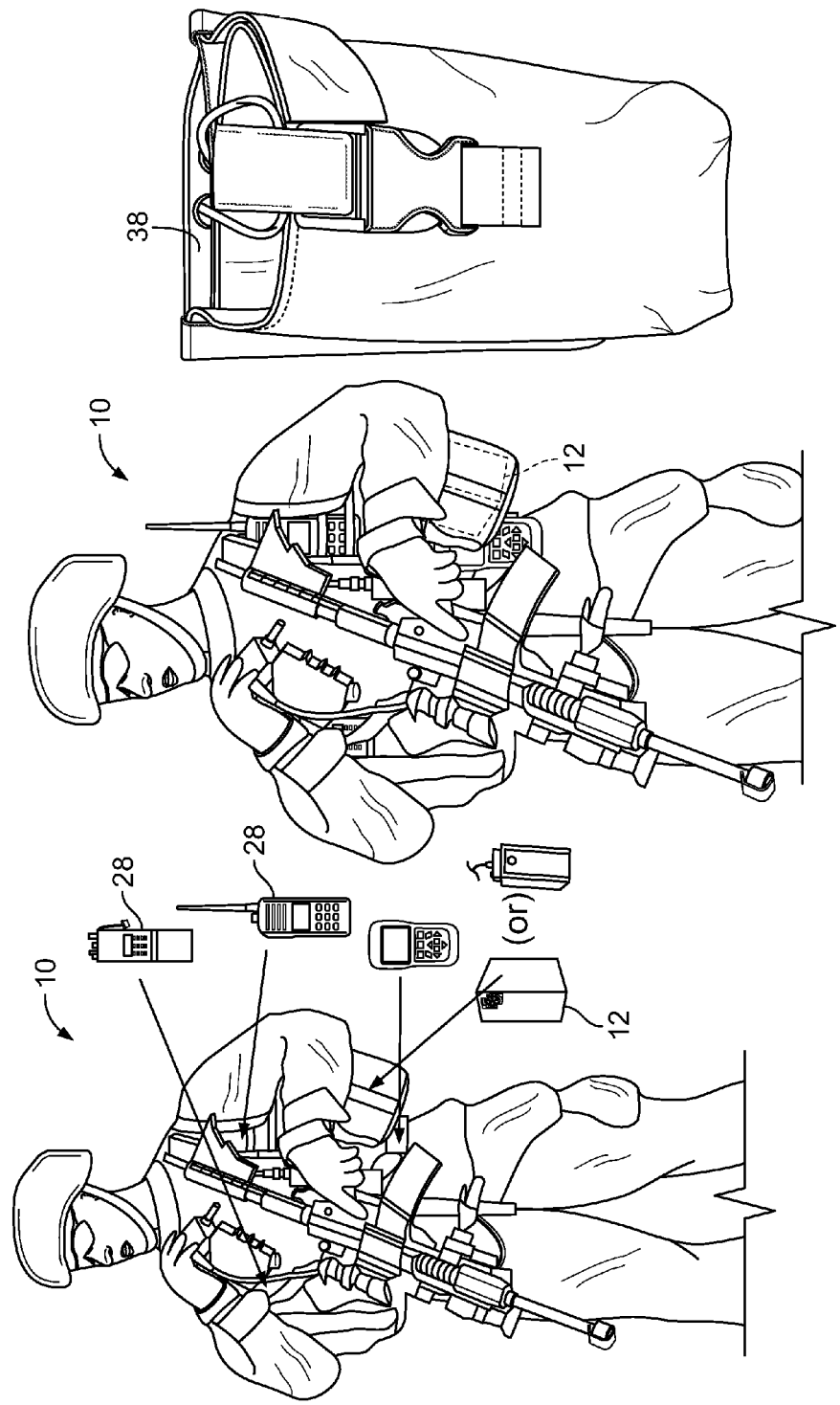
FIG. 2 shows the portable multiple battery rapid charging system of FIG. 1 as it may be worn by a soldier, according to an embodiment of the present invention.

FIG. 1 is an exploded view of the components of a portable multiple battery rapid charging system 10, according to an embodiment of the present invention. FIG. 2 shows the portable multiple battery rapid charging system 10 of FIG. 1 as it may be worn by a soldier on his body armor system. The system 10 includes a light weight power source 12, preferably, but not limited to, a high capacity charging battery, a multi-port power distribution hub 14 removably connectable to the power source 12, one or more chargers 18 removably connectable to the multi-port power distribution hub 14, and one or more cable adapters 20 removably connectable to the multi-port power distribution hub 14. The adapters 20 are configured to be removably connectable to a device 21 having a direct charging port 22, and/or to a removable battery pack 24, such as an AA-type battery pack. Each of the chargers 18 is configured to include variable-shaped housings 26 configured to conformally receive rechargeable electronic devices 28 in their entirety (as opposed to the stand-alone removable battery pack 24) worn by the soldier for charging the internal batteries of the electronic devices 28 without removing their respective batteries.

A given housing 26 is compatible with a plurality of types of rechargeable electronic devices 28 typically carried by the soldier. Each of the housings 26 includes a cable 30 that is fixedly attached to the housing 22 on one end 23 and removably attachable with a connector 32 to a corresponding mating connector 33 that is fixedly attached via a cable 34 to the multi-port power distribution hub 14. Each of the housings 26 includes an internal charger 18 to be described in connection with FIG. 8 hereinbelow. Each of the chargers 18 is configured to be removably insertable into one of a plurality of pouches 38 for receiving and charging an electronic device 28 to be described hereinbelow in connection with FIGS. 8 and 9.

Referring now to FIG. 2, a soldier wears the system 10 with the a light weight power source 12 fitted to the back of their body armor system and the pouches 38, the direct charging port 22, and the removable battery pack 24 fitted to their body armor system, with cabling affixed to their body armor system preferably over their shoulders. Electronic devices having a corresponding conformal housing 26 are operable to be inserted and left in their respective pouch 38 to be continuously charged. Other devices may be removably connected to the direct charging port 22, and/or to the removable battery pack 24. At all times, the soldier may remove a device from its pouch/adapter when needed and return the device to its pouch/adapter when the device is not in use.

In a preferred embodiment, the power source 12 is a zinc-air battery, such as the BA-8140/U battery manufactured by Electric Fuel Battery Corporation (EFB) of Auburn, Ala., although other light-weight high power sources may be employed, such as, but not limited to, other battery types, a solar cell-based charging device, an AC-to-DC power supply, and a movement-to-charge transducer (converter), or a centralized inductive charging system.

Figure 3:
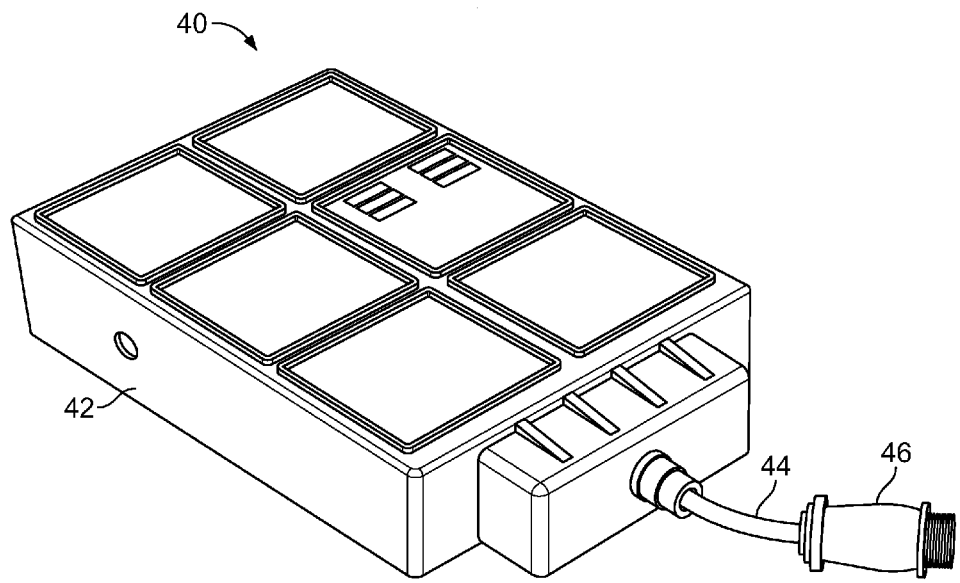
FIG. 3 is a perspective view of a zinc-air battery assembly, according to an embodiment of the present invention.
Figure 4:
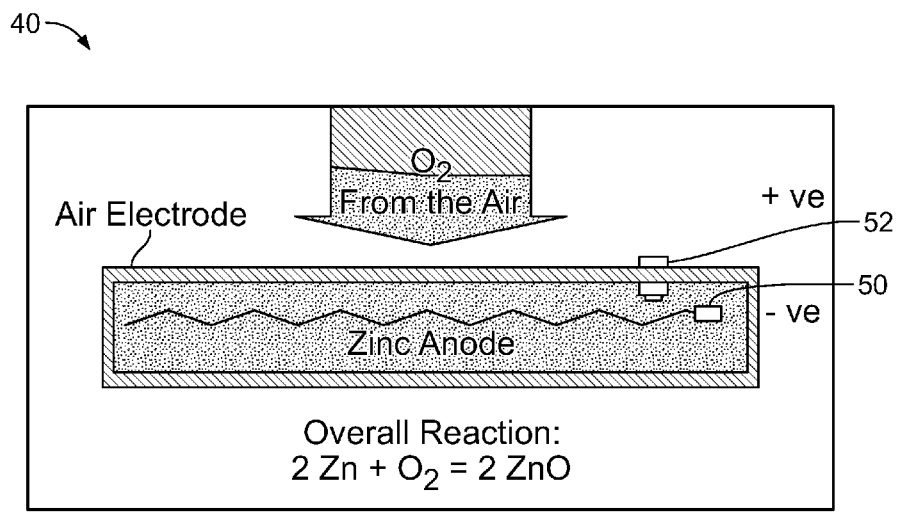
FIG. 4 is a cutaway view if the internal workings of the zinc air battery of FIG. 3, according to an embodiment of the present invention.

FIG. 3 is a perspective view of a zinc-air battery assembly, according to an embodiment of the present invention. FIG. 4 is a cutaway view if the internal workings of the zinc air battery of FIG. 3, according to an embodiment of the present invention. The zinc-air battery 40 is contained within a housing 42 configured to operate under military environmental standards. A fixedly attached coaxial cable 44 having a connector 46 extends from the housing 42. The zinc-air battery 40 encased in the housing 42 may have, but is not limited to, a nominal output voltage of about 14 VDC and a capacity of about 30 Ah. Referring now to FIG. 4, the zinc-air battery 40 includes a zinc anode 50 and an air electrode 52. The zinc-air battery 40 provides electrical power through the electrochemical oxidation of the zinc anode 50 by atmospheric oxygen according to the overall chemical reaction:

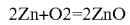

2Zn+O2=2ZnO

Since the Zinc-air battery 40 possesses an electrochemistry similar to an alkaline manganese battery, it has similar safety and environmental properties, and additional advantageous properties of high energy density, light weight, low cost, and inherent safety.

Figure 5A:
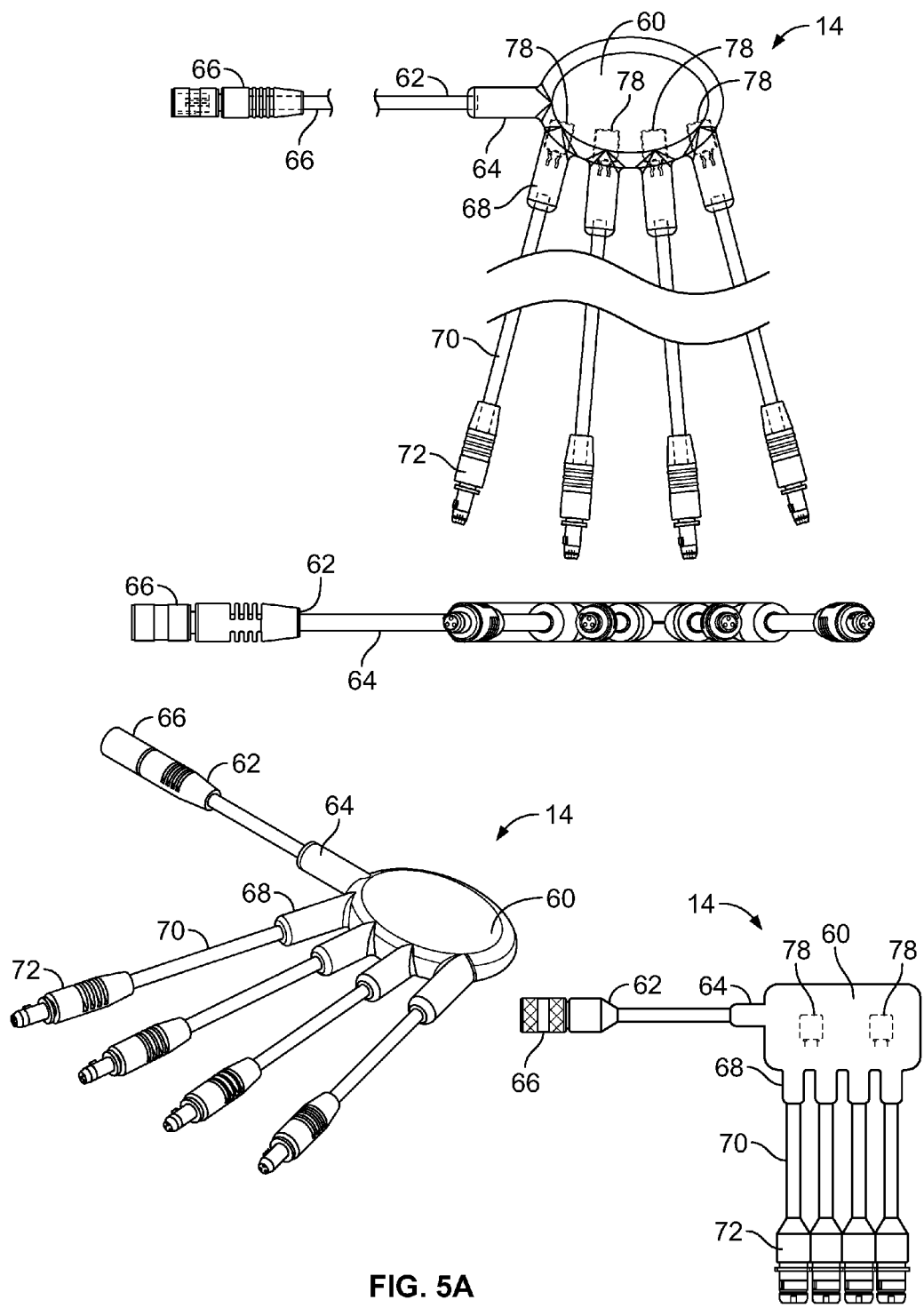
FIG. 5A is a top down view of an exemplary power distribution hub of FIG. 1, according to an embodiment of the present invention.
Figure 6:
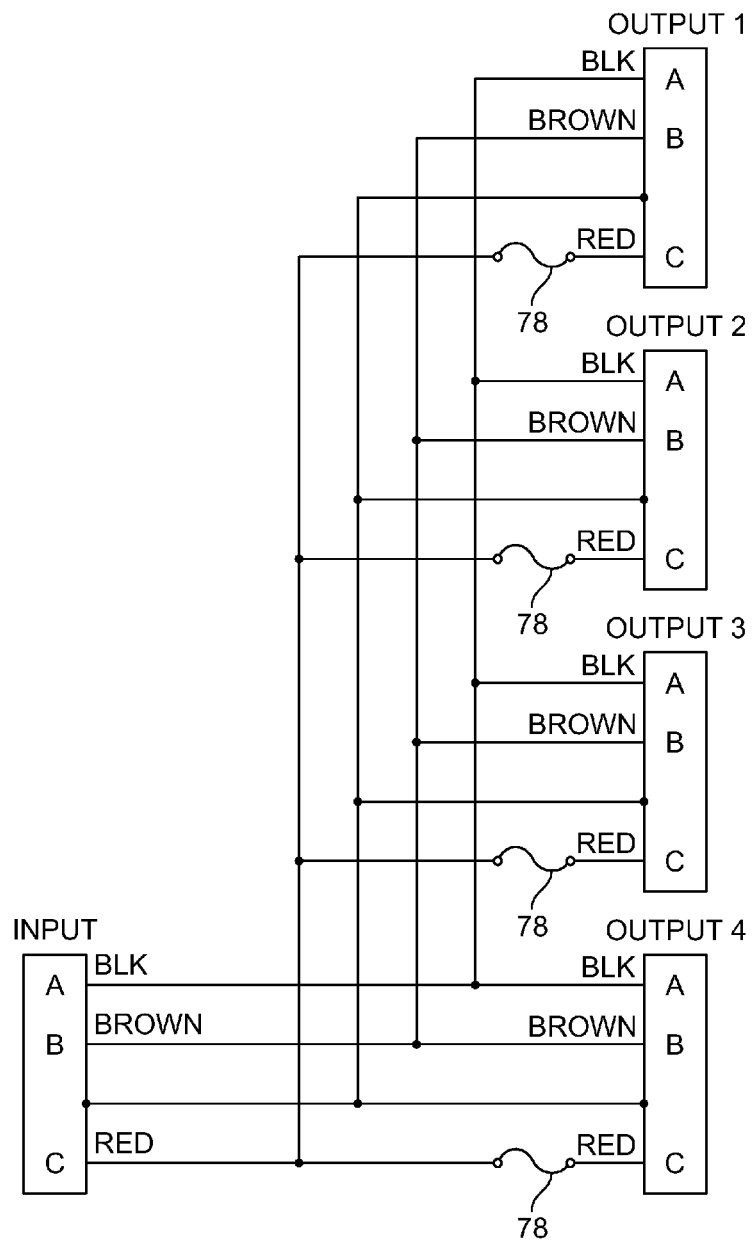
FIG. 6 is an internal wiring diagram of the power distribution hub of FIG. 5A, according to an embodiment of the present invention.

FIG. 5A is a top down view of the power distribution hub 14, while FIG. 6 shows internal wiring connectivity within the power distribution hub 14, according to an embodiment of the present invention. The power distribution hub 14 is adapted to provide passive electrical and mechanical connectivity between active devices to be described hereinbelow. Referring now to FIG. 5A, the power distribution hub 14 includes a central wiring distribution chamber 60, an input power supply port 62 comprising a fixedly attached input power supply cable 64 and corresponding connector 66, and a plurality of fixedly attached output power charger ports 68 each associated with an output cable 70 and corresponding support connector 72. In a preferred embodiment, the number of output cables 70 is four: two configured to be connected to corresponding a housing charger 26, one associated with cable a direct charging port 22, and one associated with the removable battery pack 24.

Figure 5B:
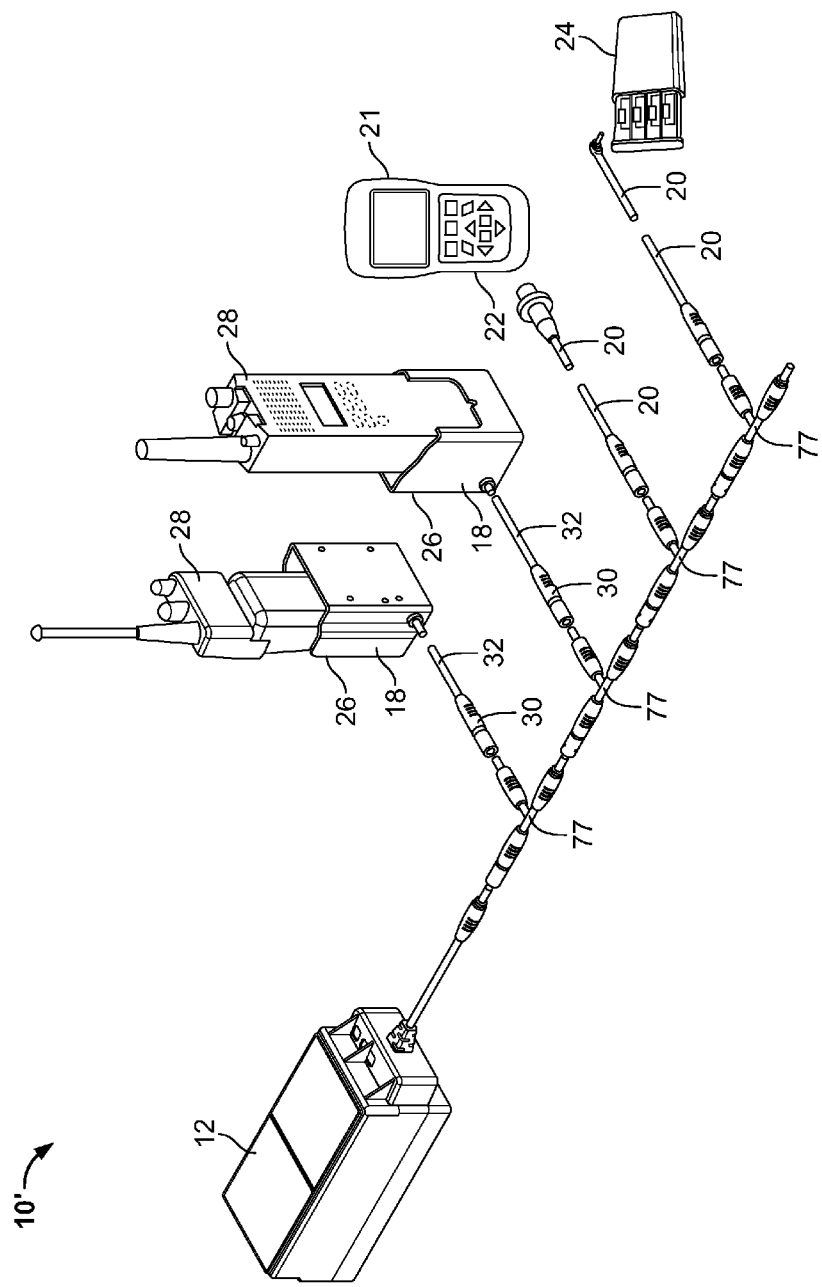
FIG. 5B shows a "hub-less" alternative embodiment of the system of FIG. 5A, according to an embodiment of the present invention.

FIG. 5B shows a "hub-less" alternative embodiment of the system 10 of FIG. 5A, according to an embodiment of the present invention. To bypass the limited connectivity (i.e., the number of connectable chargers 26) of the hub 14, the system 10' dispenses with the power distribution hub 14 of FIG. 5A altogether. The hub 14 is replaced with one or more T-connectors 77 which may be fitted together as shown to permit a relatively unlimited number of chargers 26 to be connected to the power source 12 in a "parallel" configuration.

Referring now to FIGS. 5A and 6, the input power supply port 62 associated with the input power supply cable 64 of the power distribution hub 14 is electrically connected in parallel to each of the output power charger ports 68 associated with each of the output cables 70 via a BLK lead for providing a return and a RED lead for providing a high potential. Over-current protection is provided in series with each of the RED leads by a re-usable fuse-like device 78. In a preferred embodiment, re-usable fuse-like device 78 is a positive temperature coefficient (PTC) resistor. The nominal input-output voltage of the power distribution hub 14 is about 12V in-12V out, with an operating range of between −20° C. to +60° C. The dimensions of the central wiring distribution chamber 60 are on the order of about 20 cm×67 cm by 67 cm, with a weight of about 0.13 kg.

Figure 7:
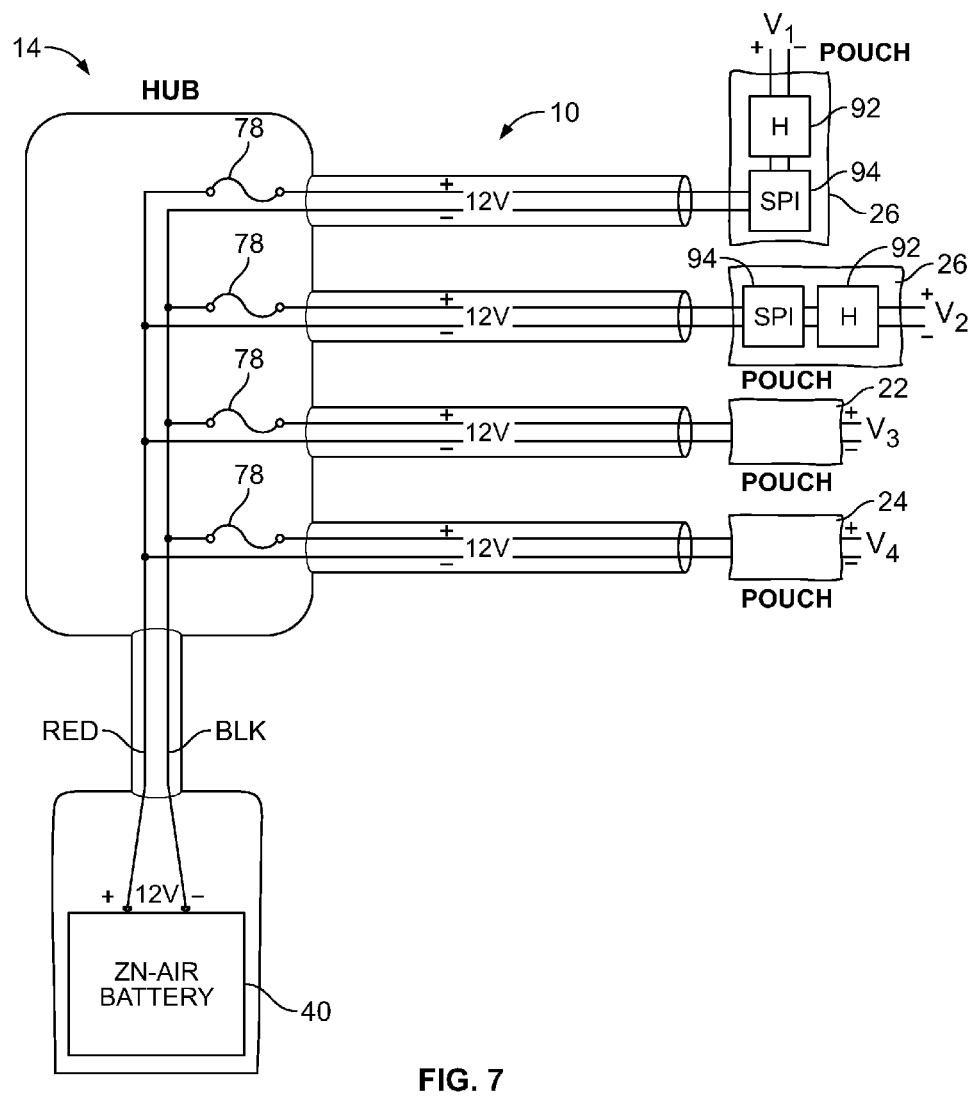
FIG. 7 is an internal wiring diagram showing wiring connections and electrical circuitry of a fully assembled system, according to an embodiment of the present invention.

FIG. 7 is an internal wiring diagram showing wiring connections and electrical circuitry of a fully assembled system 10, according to an embodiment of the present invention. The zinc-air battery 40 is electrically connected to the power distribution hub 14 by the high potential RED lead and the low potential BLK lead which pass power directly within the power distribution hub 14 via each of the re-usable fuse-like devices 78 to the direct charging port 22 and the removable battery pack 24, or pass power to each of the housings 26. Each of the housings 26 includes a built-in charger 18. In a preferred embodiment, the chargers 18 receive a nominal 12 V input at varying levels of current, and supply various values of output voltages/current to the electronic devices 28 removably insertable into the housings 26.

Figure 8:
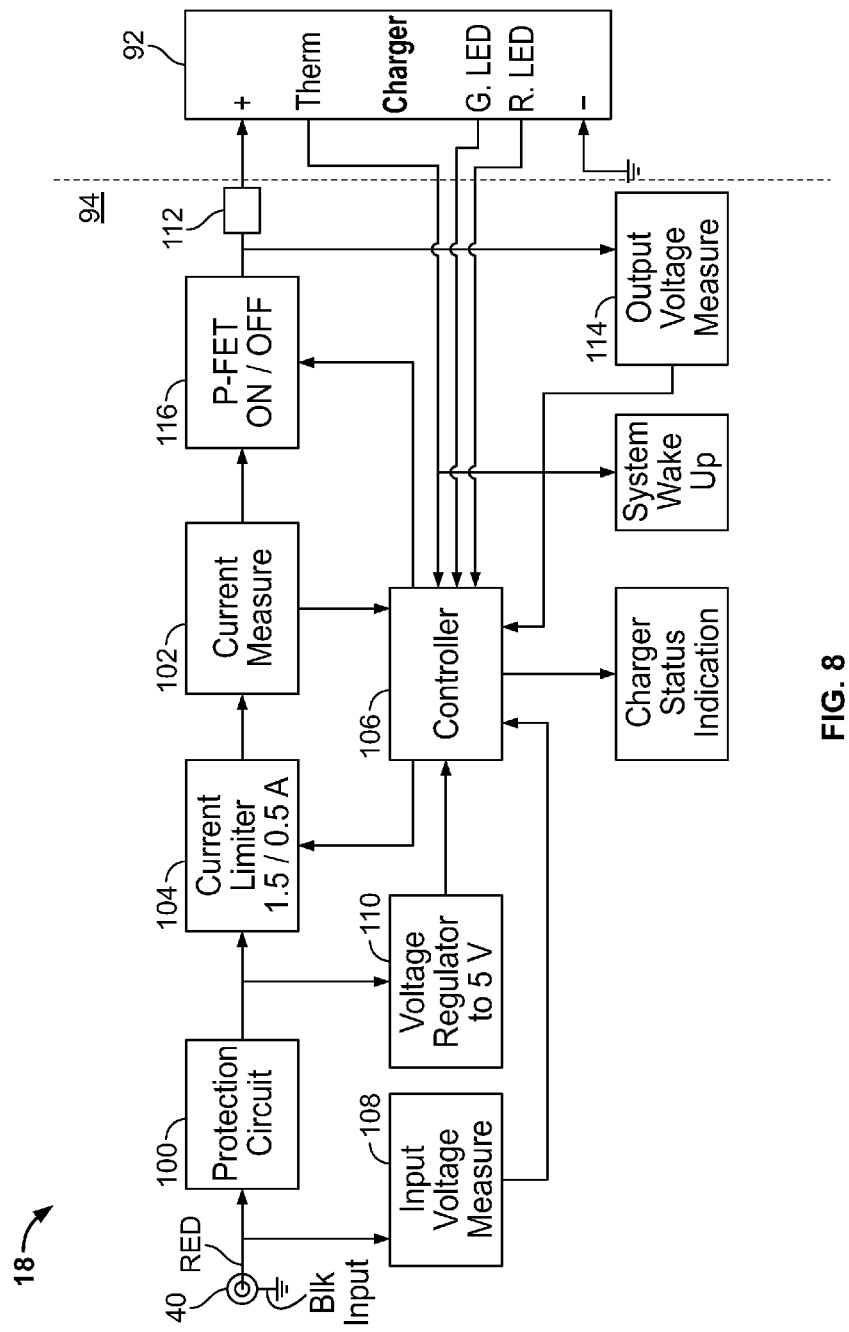
FIG. 8 is an electrical block diagram of an exemplary equipment charger, according to an embodiment of the present invention.

FIG. 8 is an electrical block diagram of an exemplary charger 18, according to an embodiment of the present invention. The charger 18 comprises a charging circuit 92 and a charger controller 94. The charger 18 is operable to charge a rechargeable application battery according to a powering algorithm to be described hereinbelow in connection with FIG. 9.

The charger controller 94 includes an over-voltage protection circuit 100 operable to protect against voltage surges that may be applied or induced between the high potential RED lead and the low potential BLK lead inputs of the charger 18. These over-voltage surges may originate from the charging source such as zinc-air battery 40 or be induced on inputs from the external environment (e.g., lightning). A current monitor 102 and a current limiter 104 are electrically connected in series with an output of the over-voltage protection circuit 100. The current monitor 102 measures the input current emanating from the externally connected zinc-air battery 40 and provides a measured parameter for decisions made in a charging algorithm programmed into a micro-controller 106 electrically connected to the current monitor 102. In a preferred embodiment, the input current is limited by the current limiter 104 to 0.5 amps and 1.5 amps for clamping DC output current originating from the charger 18 and surge currents that accompany induced voltages surges from the external environment, respectively.

An input voltage monitoring circuit 108 and a voltage regulator 110 flank the input and output of the over-voltage protection circuit 100, respectively, and are likewise electrically connected as inputs to the micro-controller 106. Similarly to the current monitor 102, the input voltage monitoring circuit 108 monitors the charging voltage of the externally-connected zinc-air battery 40 and provides a second measured parameter for decisions made in a charging algorithm programmed into a micro-controller 106. The voltage regulator 100 steps down the output voltage of the zinc-air battery 40 to a predetermined level suitable for powering digital circuitry, including the micro-controller 106.

The micro-controller 106 further receives measurement parameters that monitor the output charging current and voltage associated with current and voltage outputs of the charging circuit 92 via an output current monitor 112 and an output voltage monitor 114, respectively. The current and voltage outputs of the charging circuit 92 are representative of the charging current and voltage applied to the external removable battery pack 24. The micro-controller 106 also receives at least an indication of ambient temperature from a temperature measuring device (not shown) that is operable to set a temperature dependent minimum and maximum zinc-air battery charging voltage to be described in connection with the powering algorithm of FIG. 9 hereinbelow.

Figure 9:
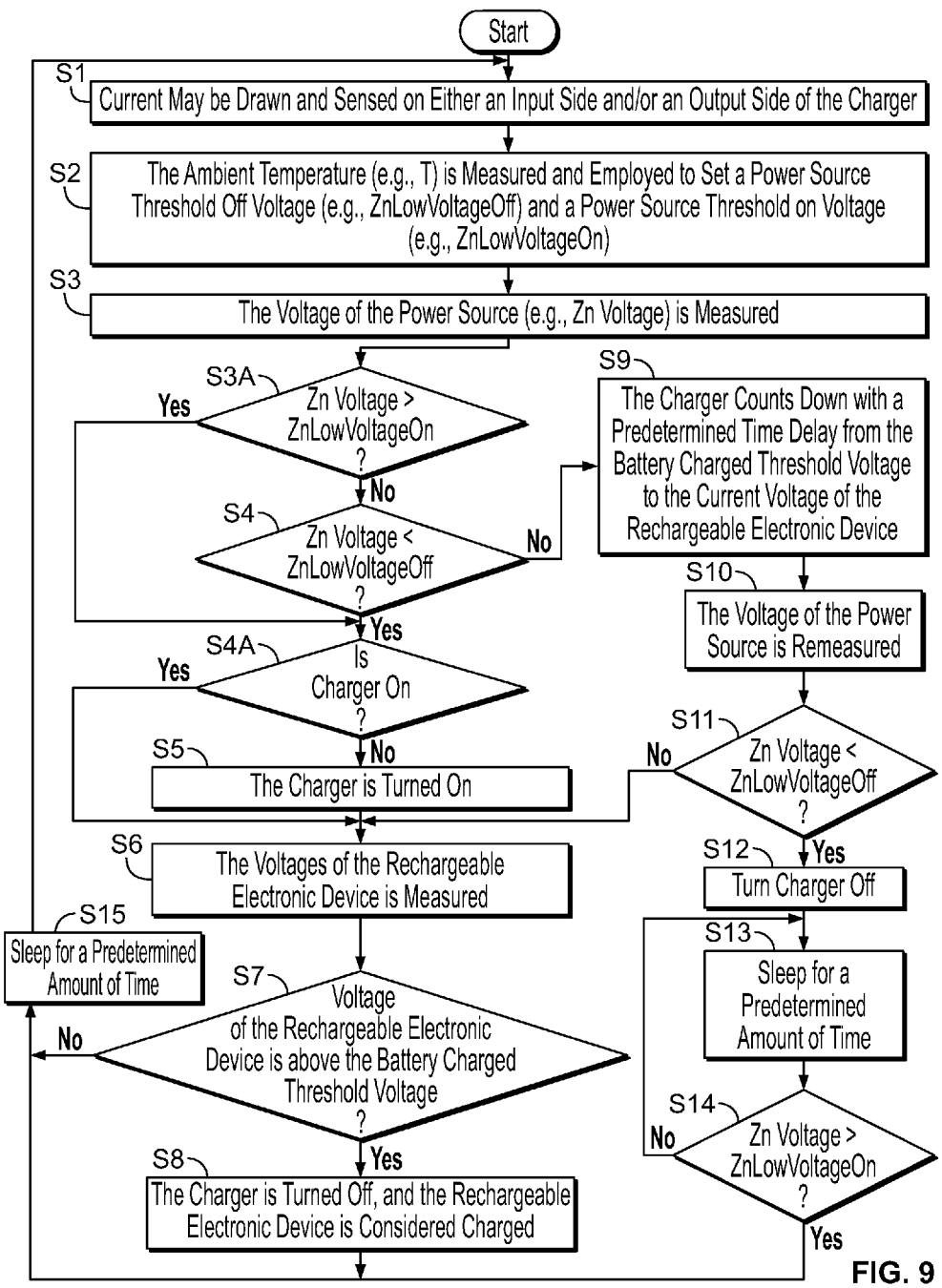
FIG. 9 is a process flow diagram exhibiting exemplary steps of a method for operating the equipment charger of FIG. 8, according to an embodiment of the present invention.

The microcontroller 106 is configured to receive the indicated currents, voltages, and temperature inputs to render a decision as to whether to power and therefore activate the charging circuit 92 according to the powering algorithm of FIG. 9. The microcontroller 106 may be, but is not limited to, the PIC16F91X manufactured by Microchip Corporation. Power is applied or removed from the charging circuit 92 via a power switch 116, which may be, but is not limited to, a p-type FET, such as the Si4401BDY manufactured by Vishay/Siliconix.

The charging circuit 92 may be, for example, a complete off-the-shelf constant current source-type battery charger board, such as, but not limited to, the MIBTR or FALCON III manufactured by EFB, or it may comprise, but is not limited to, a programmable battery charger IC, such as, but not limited to, the CY8C27243-24PVI manufactured by Cypress Semiconductor, Inc., or the LT3652DFN13 manufactured by Linear Technologies, Inc. For the latter programmable battery charger IC, maximum charge current and maximum compliance voltage may be preset by external analog circuitry as outlined in the latter's datasheet. In a preferred embodiment, the maximum (constant) charging current is set to about 2 amps and peak maximum compliance voltage to about 17 volts.

FIG. 9 is a process flow diagram exhibiting exemplary steps of a method for operating the charger 18 of FIG. 8, according to an embodiment of the present invention. Initially, the charger 18 is "asleep" (i.e., no rechargeable electronic device 28 to be charged is attached and the charger 18 is switched off). In step S1, when the rechargeable electronic device 28 is attached, it presents a non-infinite resistive load to the charger 18. As a result, current may be drawn and sensed on either an input side and/or an output side of the charger 18. Further, the charger 18 "awakens" and in step S2, the ambient temperature (e.g., T) is measured and employed to set a power source threshold off voltage (e.g., ZnLowVoltageOff) and a power source threshold on voltage (e.g., ZnLowVoltageOn). The power source threshold off voltage is a predetermined voltage level below which the power source 12 cannot charge the rechargeable electronic device 28 and needs to recover. In such circumstances, it is necessary to reduce the total load on the power source 12 by "disconnecting" one or more of the rechargeable electronic devices 28 to be described hereinbelow. Hysteresis is built into the power source threshold on voltage, which is set to a predetermined voltage level greater than power source threshold off voltage above which the power source 12 is considered to have recovered and charging the rechargeable electronic device 28 may resume.

For example, assuming current is sensed and the charger 18 "awakens," Table 1 illustrates the resulting power source threshold off voltages and the power source threshold on voltages:

TABLE 1

|  | ZnLowVoltageOff | ZnLowVoltageOn |
|---|---|---|
| T > 10 C | 11 volts | 11.5 volts |
| −10 C < T < 10 C | 10.75 volts | 11.25 volts |
| T < −10 C | 10.5 volts | 11 volts |

At step S3, the voltage of the power source (e.g., Zn voltage) is measured. At step S3A, if the voltage of the power source 12 (e.g., Zn voltage) is greater than the power source threshold off voltage (e.g., ZnLowVoltageOff), then at step S4A, if the charger has not been turned on, then at step S5, the charger 18 is turned on to charge the rechargeable electronic device 28. In step S6, the voltage of the rechargeable electronic device 28 is measured. If, in step S7, the voltage of the rechargeable electronic device 28 is above the battery charged threshold voltage, then in step S8, the charger 18 is turned off, and the rechargeable electronic device 28 is considered charged. In a preferred embodiment, the battery charged threshold voltage is set to a predetermined percentage/level below the full voltage rating of the rechargeable electronic device 28 (e.g., if the battery rating is 12 volts, then the battery charged threshold voltage may be set to about 10 volts).

If, in step S4, the voltage of the power source 12 (e.g., Zn voltage) falls below the power source threshold off voltage (e.g., ZnLowVoltageOff), then the power source 12 is assumed to be depleted of charge, and needs to recover. In such circumstances, in step S9, the charger 18 begins a count down from the battery charged threshold voltage to the current voltage of the rechargeable electronic device 28 (i.e., the actual application battery voltage) in steps corresponding to a predetermined time delay.

For example, in a preferred embodiment, if the battery charged threshold voltage is 10 volts and the actual application battery voltage is 6 volts, then the charger 18 counts down from 10 volts to 6 volts in decrements of 100 mV (e.g., 8.0 V, 7.9 V, 7.8 V, ... 6.2 V, 6.1 V, 6.0 V) wherein the time between counts is set to 100 msec (e.g., 8.0 V at time 0 msec, 7.9 V at time 100 msec, 7.8 V at time 200 msec, ... 6.2 V at time 3800 msec, 6.1 V at time 3900 msec, 6.0 V at time 4000 msec). In other embodiments, counting may be performed in increments of 100 msec from 6 V to 10 V. In other embodiments, certain chargers 18 may have greater or lesser priority for being charged than other chargers 18. In such circumstances, the voltage and/or time increment may be set to other values to count in a shorter or larger time/voltage interval (e.g., 20 mV decrements/increments in 10 msec increments or 200 mV increments/decrements at 200 msec increments). In the limiting case, the priority of one or more chargers may be so great that the time increment is infinite (equivalent to always charging the rechargeable electronic device 28).

When the count reaches the voltage of the rechargeable electronic device 28, in step S10, the voltage of the power source 12 is re-measured. If, in step S11, the voltage of the power source 12 is still below the power source threshold off voltage (e.g., ZnLowVoltageOff), then in Step S12, the charger 18 is turned off; otherwise, the charger 18 continues to charge the rechargeable electronic device 28 in step S6. In step S13, the charger sleeps for a predetermined time delay to allow the power source 12 to recover. If in step S14, the voltage of the power source 12 is now above the power source threshold on voltage (e.g., ZnLowVoltageOn), then in Step S15, the charger 18 "sleeps" a predetermined amount of time, and then the method returns to step S1, ad infinitum.

Since all connected chargers 12 follow have the same method of steps S3-S16, the most fully charged rechargeable electronic device 28 is associated with the charger 18 that switches off first, allowing the power source 12 to recover so it can continue charging the other rechargable electronic device 28. When the voltage of the power source 12 rises again above the power source threshold on voltages (e.g., ZnLowVoltageOn), the rechargeable electronic device 28 whose associated charger was switched off may be switched on again to charge that rechargeable electronic device 28. If a particular rechargeable electronic device 28 is deemed to always be more important than others, as described above the charger 18 can count more slowly (i.e., have a larger predetermined time delay), or not at all.

The main advantage of the method outlined in FIG. 9 is that a central expensive control box/processor is not needed to prioritize which rechargeable electronic device 28 is switched off first. In addition, as illustrated in the "hub-less" embodiment of FIG. 5B, no central hub is needed. As a result, a nearly unlimited number of rechargeable electronic devices 28 may be strung together in a parallel network.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An apparatus for charging at least one device, comprising:
   a power source;
   at least one charger in electrical communication with the power source, wherein the at least one charger comprises a micro-controller configured to:
   (a) measure a first voltage of the power source and a first voltage of the at least one device;
   (b) charge the at least one device when the measured first voltage of the power source is greater than or equal to a preset power source on voltage but less than a preset battery charged voltage;
   (c) refrain from charging the at least one device when the measured first voltage of the power source is greater than or equal to the preset battery charged voltage; and
   (d) wait a time delay based on a magnitude of a difference between the preset battery charged voltage and the measured first voltage of the at least one device and measure a second voltage of the power source and a second voltage of the at least one device when the measured first voltage of the power source is less than or equal to a preset power source off voltage that is less than the preset power source on voltage and
   (e) charge the at least one device when the measured second voltage of the power source is greater than the preset power source on voltage and
   (f) refrain from charging the at least one device when the measured second voltage of the power source is greater than the preset battery charged voltage or less than or equal to the preset power source off voltage, and at least one housing configured to encase the at least one charger and to conformally receive the at least one device; and at least one pouch configured to receive the at least one charger, the at least one device, and the at least one housing, wherein the the at least one device is removably insertable into the at least one pouch and the at least one charger, and wherein the apparatus is configured to be worn by a user.

2. The apparatus of claim 1, wherein the at least one charger is a plurality of chargers and wherein a charger associated with a device having the smallest difference between its rated voltage and its measured voltage discontinues charging before other chargers of the plurality of chargers.

3. The apparatus of claim 1, wherein the preset battery charged voltage is a below a rated voltage of the at least one device.

4. The apparatus of claim 1, wherein the preset battery charged voltage is a voltage corresponding to a percentage of a rated voltage.

5. The apparatus of claim 1, wherein the at least one charger is a plurality of chargers and wherein the plurality of chargers are connected in parallel with the power source.

6. The apparatus of claim 5, wherein the battery is a zinc-air battery.

7. The apparatus of claim 1, wherein the power source is a battery.

8. The apparatus of claim 1, wherein the at least one charger is a plurality of chargers and further comprising a hub connected between the power source and the plurality of chargers, wherein the hub is configured to provide electrical and mechanical connectivity between the power source and the plurality of chargers.

9. The apparatus of claim 1, wherein the at least one charger is a plurality of chargers and further comprising a plurality of T-connectors connected between the power source and each of the plurality of chargers, wherein the plurality of T-connectors is configured to provide electrical and mechanical connectivity between the power source and the plurality of chargers.

10. The system of claim 1, wherein the micro-controller is further configured to repeat steps (a) to (f).

11. The system of claim 1, wherein the micro-controller is further configured to measure an ambient temperature and to set the preset power source off voltage, the preset power source on voltage, and the preset battery charged based on the measured ambient temperature.

12. The system of claim 1, wherein the time delay based on the magnitude of a difference between the preset battery charged voltage and the measured first voltage of the device is proportional to the difference between the battery charged voltage and the first measured voltage of the device.

13. The system of claim 1, wherein waiting the time delay based on a magnitude of a difference between the preset battery charged voltage and the measured first voltage of the device comprises:

setting and decrementing or incrementing a counter in preset increments or decrements of time, wherein an initial value of the counter is proportional to the difference between the battery charged voltage and the first measured voltage of the device.

14. A method for charging at least one device from a power source with at least one charger, comprising the steps of:

(a) measuring, using a micro-controller, a first voltage of the power source and a first voltage of the at least one device;

(b) charging the at least one device when the measured first voltage of the power source is greater than or equal to a preset power source on voltage but less than a preset battery charged voltage;

(c) refraining from charging the at least one device when the measured first voltage of the power source is greater than or equal to the preset battery charged voltage; and (d) waiting a time delay based on a magnitude of a difference between the preset battery charged voltage and the measured first voltage of the at least one device and measuring a second voltage of the power source and a second voltage of the at least one device when the measured first voltage of the power source is less than or equal to a preset power source off voltage that is less than the preset power source on voltage and (e) charging the at least one device when the measured second voltage of the power source is greater than the preset power source on voltage and (f) refraining from charging the at least one device when the measured second voltage of the power source is greater than the preset battery charged voltage or less than or equal to the preset power source off voltage.

15. The method of claim 14, wherein the preset battery charged voltage is a below a rated voltage of the at least one device.

16. The method of claim 14, wherein the preset battery charged voltage is a voltage corresponding to a percentage of a rated voltage.

17. The method of claim 14, wherein the at least one charger is a plurality of chargers and wherein a charger associated with a device having the smallest difference between its rated voltage and its measured voltage discontinues charging before other chargers of the plurality of chargers.

18. The method of claim 14, further comprising repeating steps (a) to (f).

19. The method of claim 14, further comprising measuring an ambient temperature and setting the preset power source off voltage, the preset power source on voltage, and the preset battery charged based on the measured ambient temperature.

20. The method of claim 14, wherein the time delay based on the magnitude of a difference between the preset battery charged voltage and the measured first voltage of the device is proportional to the difference between the battery charged voltage and the first measured voltage of the device.

21. The method of claim 14, wherein waiting the time delay based on a magnitude of a difference between the preset battery charged voltage and the measured first voltage of the device comprises:

setting and decrementing or incrementing a counter in preset increments or decrements of time, wherein an initial value of the counter is proportional to the difference between the battery charged voltage and the first measured voltage of the device.

* * * * *